United States Patent
Karlsson

(10) Patent No.: US 10,924,929 B2
(45) Date of Patent: Feb. 16, 2021

(54) WIRELESS COMMUNICATION SYSTEM

(71) Applicant: ICOMERA AB, Gothenburg (SE)

(72) Inventor: Mats Karlsson, Gothenburg (SE)

(73) Assignee: ICOMERA AB, Göteborg (SE)

( * ) Notice: Subject to any disclaimer, the term of this patent is extended or adjusted under 35 U.S.C. 154(b) by 0 days.

(21) Appl. No.: 15/593,826

(22) Filed: May 12, 2017

(65) Prior Publication Data

US 2017/0339124 A1 Nov. 23, 2017

(30) Foreign Application Priority Data

May 19, 2016 (SE) ...................................... 1650680

(51) Int. Cl.
*H04L 29/06* (2006.01)
*H04W 12/06* (2021.01)
(Continued)

(52) U.S. Cl.
CPC ......... *H04W 12/0602* (2019.01); *H04L 45/70* (2013.01); *H04L 63/08* (2013.01);
(Continued)

(58) Field of Classification Search
None
See application file for complete search history.

(56) References Cited

U.S. PATENT DOCUMENTS 7,061,860 B1 6/2006 Calvignac et al.
7,522,876 B1 * 4/2009 Meitzen ................ H04W 88/08
455/11.1

(Continued)

FOREIGN PATENT DOCUMENTS

EP 1 175 757 B1 1/2005
EP 1 912 385 A1 4/2008
(Continued)

OTHER PUBLICATIONS

Chhabra, Amit; Singh, Dheerendra. Assessment of VoIP E-model over 802.11 wireless mesh network. 2015 International Conference on Advances in Computer Engineering and Applications. https://ieeexplore.ieee.org/stamp/stamp.jsp?tp=&arnumber=7164824 (Year: 2015).*

(Continued)

*Primary Examiner* — Jeremiah L Avery

(74) *Attorney, Agent, or Firm* — Buchanan Ingersoll & Rooney P.C.

(57) ABSTRACT

A method and system for wireless communication between a public transport vehicle and a remote server through at least one external mobile network. At least one router is provided in the public transport vehicle for receiving and transmitting wireless data to and from a stationary communication server outside the public transport vehicle and to and from at least one client onboard the public transport vehicle, wherein router includes a captive portal in order to provide an authentication process for the client(s). The router determines if a stream of wireless data packets received by said router corresponds to at least one of a VoIP stream and a VoWIFI stream. The router then forwards, if it has been determined that the stream of wireless data packets corresponds to at least one of a VoIP stream and a VoWIFI stream.

10 Claims, 2 Drawing Sheets

(51) Int. Cl.
*H04L 12/721* (2013.01)
*H04W 84/00* (2009.01)
*H04M 1/253* (2006.01)
*H04W 84/04* (2009.01)
*H04W 84/12* (2009.01)

(52) U.S. Cl.
CPC ......... *H04L 63/101* (2013.01); *H04M 1/2535* (2013.01); *H04W 84/005* (2013.01); *H04W 84/047* (2013.01); *H04W 84/12* (2013.01)

(56) References Cited

U.S. PATENT DOCUMENTS

| | | | |
|---|---|---|---|
| 7,787,600 | B1 | 8/2010 | Bari |
| 8,589,541 | B2* | 11/2013 | Raleigh ............... H04L 41/0893 709/224 |
| 10,530,598 | B2* | 1/2020 | Ansari ................ H04L 61/1552 |
| 2004/0111461 | A1 | 6/2004 | Claudatos et al. |
| 2005/0172008 | A1 | 8/2005 | Claudatos et al. |
| 2005/0286466 | A1* | 12/2005 | Tagg ................. H04W 36/0022 370/329 |
| 2008/0305762 | A1* | 12/2008 | Malosh ............. H04B 7/18506 455/404.1 |
| 2011/0314145 | A1* | 12/2011 | Raleigh ............... H04W 28/021 709/224 |
| 2013/0111024 | A1 | 5/2013 | Setia et al. |
| 2016/0112520 | A1* | 4/2016 | Ganu ................ H04W 36/0083 709/223 |

FOREIGN PATENT DOCUMENTS

| | | |
|---|---|---|
| EP | 2 943 011 A1 | 11/2015 |
| SE | 1451302 A1 | 5/2016 |
| WO | WO 2016/068781 A1 | 5/2016 |

OTHER PUBLICATIONS

Basurto, Juan Carlos; Estrada, Rebeca. An Experimental Study of VoIP Performance in Wireless Mesh Networks Using Different Mobility Approaches. 2010 2nd International Conference on Software Technology and Engineering. https://ieeexplore.ieee.org/stamp/stamp.jsp?tp=&arnumber=5608857 (Year: 2010).*

Sengupta, Shamik et al. Improving Quality of VoIP Streams over WiMax. IEEE Transactions on Computers, vol. 57, Issue: 2. https://ieeexplore.ieee.org/stamp/stamp.jsp?tp=&arnumber=4358249 (Year: 2008).*

Anonymous: "Captive Portal—Wikipedia," (May 18, 2016), Retrieved from the Internet: URL:https://en.wikipedia.org/w/index.php?title=Captive_portal&oldid=720808303 [retrieved on Jun. 27, 2017], pp. 1-5.

The extended European Search Report dated Aug. 11, 2017, by the European Patent Office in corresponding European Patent Application No. 17168353.5-1870. (8 pages).

Swedish Office Action dated Nov. 3, 2016, issued in corresponding Swedish Patent Application No. 1650680-0. (7 pages).

Swedish Search Report dated Nov. 3, 2016, issued by the Swedish Patent Office in the corresponding European Patent Application No. 1650680-0. (2 pages).

* cited by examiner

WIRELESS COMMUNICATION SYSTEM

TECHNICAL FIELD OF THE INVENTION

The present invention relates to a wireless communication system for public transport vehicles, such as trains, and a related method.

BACKGROUND

The demands on wireless communication capabilities in today's society are increasing rapidly. In particular, fast and easily accessible communication is desired through handheld devices over large areas. It is particularly challenging to achieve such communication for mobile devices which are moving, e.g. when moving over large distances with poor network coverage or when affected by unknown sources of noise interrupting a signal for communication, such as clients moving on e.g. trains, airplanes, busses and other types of public transport vehicles. In particular, if a client, such as a mobile phone, moves over large areas the client has to connect to several base stations in order to maintain a sufficient connection for communication.

This increasing demand from passengers to be able to communicate through mobile phones and other handheld terminals when travelling on e.g. trains, also includes an increased demand to be able to get access to the Internet with laptops, PDAs etc. Further, with the new smartphones, and the way these are used, with e.g. continuously operating applications, many phones are active at all times, meaning that many handovers are required when the train moves. Even though this problem is common for all public transport vehicles, it is especially pronounced for vehicles moving at high speed, such as trains and airplanes, and trains are in addition facing problems with poor line-of-sight between the base stations and the train. This puts a strain on the wireless network infrastructure, leading to poor performance.

Moreover, train carriages are made of metal, and even the windows are normally covered with a metal film. Accordingly, train carriages are shielded compartments, and direct communication between terminal antennas within the carriages and externally located antennas is difficult to obtain. The mobile nature of a client with respect to the base stations may also introduce several potential sources of communication performance degradation. Such sources may derive from complex terrain, competition for available channels, or the source may be an unknown source of noise related to e.g. radio-frequency interference.

To this end, public transport vehicles, such as train carriages, are often provided with an external antenna connected to a repeater unit within the carriage, which in turn is connected to an internal antenna. Hence, the communication between the passengers' terminals and the operator antennas outside the vehicle occurs through the repeater unit. Similarly, it is known to provide a mobile access router for data communication, also connected both to an external antenna and an internal antenna, in each carriage, in order to provide Internet access on board the vehicle. Such mobile access router solutions are e.g. commercially available from the applicant of the present application, Icomera AB, of Gothenburg, Sweden, and are also disclosed in EP 1 175 757 by the same applicant. This method has greatly improved the reliability of high-bandwidth wireless communication for trains and other large vehicles.

However, a consequence of the above-described developments presents is that many problems relating to the management of data are emerging, in particular due to the sheer volume of it. Moreover, presently known solutions regarding the management of data are often inadequate in terms of user (i.e. passenger) satisfaction and are furthermore oftentimes based on out-dated requirements and passenger needs.

Further, a specific problem in known communication systems of the above-discussed type is that voice communication, such as telephone calls, are very sensitive to disturbances, such as increased latency.

There is therefore a need for an improved method and system for communicating with clients on public transport vehicles, and in particular trains, which are more up-to-date with current passenger needs and technological developments, in order to further improve the travel experience for passengers.

SUMMARY OF THE INVENTION

It is therefore an object of the present invention to provide a new and improved method for wireless communication and a wireless communication system for a public transport vehicle, in particular a train.

This object is achieved by means of a method and wireless communication system as defined in the appended claims. The term exemplary is in the following to be interpreted as; serving as an example, instance, or illustration.

According to a first aspect of the present invention there is provided a method for wireless communication between a public transport vehicle and a remote server through at least one external mobile network, the method comprising:

providing at least one router in the public transport vehicle for receiving and transmitting wireless data to and from a stationary communication server outside said public transport vehicle through said at least one external mobile network via at least one antenna and to and from at least one client onboard the public transport vehicle, wherein said at least one router includes a captive portal in order to provide an authentication process for said at least one client; said method comprising:

determining in said router, if a stream of wireless data packets received by said router corresponds to at least one of a VoIP (Voice over IP) stream and a VoWIFI (Voice over Wi-Fi) stream;

forwarding in said router, if it has been determined that said stream of wireless data packets corresponds to at least one of a VoIP stream and a VoWIFI stream, said stream of wireless data packets regardless of whether said at least one client associated with said stream of wireless data packets is authenticated by said authentication process or not.

Such a method improves the traveling experience for customers and is much more compatible with current technological trends than presently known methods for wireless communication between a public transport vehicle and a remote server.

The "captive portal" can be described as a Web page that a user of a public-access network is obliged to view (and interact with, in most cases) before access to the external network (the internet) is granted, i.e. before data packets are forwarded. The router intercepts (blocks) packages until a client is authenticated. The authentication can be performed by means of e.g. creating a user account and/or logging onto the user-account, paying a charge, or simply displaying an acceptable use policy (terms of service) and requiring that the users agrees to it. Captive portals are typically used onboard public transport vehicles, such as trains, in order to offer free or charged Wi-Fi hotspots for Internet users. This is sometimes referred to as a Universal Access Method (UAM).

The "router" (or sometimes "mobile router") is a networking router, which is a machine that forwards data packets between computer networks, on at least one data link in each direction. The router may be a mobile access router, and preferably a mobile access and applications router. The router preferably comprises means for determining if a stream of wireless data packets received by the router correspond to VoWIFI call, the means being for example appropriate hardware and/or software, from here on referred to as a control unit. The determining step can be performed on a stream of wireless data packets received from a client onboard the public transport vehicle, or from a remote server outside the vehicle.

An internal LAN may be provided inside the public transport vehicle for providing wireless communication between the router and at least one client onboard. The at least one client onboard may accordingly be connected to said router via a LAN (local area network) provided by one or more wireless access points within the public transport vehicle. Preferably, at least one such wireless access point is provided in each carriage. All wireless access points may be connected to a single, central router, arranged in one of the carriages of a train. However, each carriage in the train may also be provided with a separate router connected to at least one wireless access point, where the wireless access point may be external to the router or an integrated function of the router.

Each stationary communication server may be any server or site accessible through the exterior mobile network, such as a DNS server, an ISP infrastructure gateway, an aggregation gateway, a content provider server of interest to vehicle passengers, or the like. For all common applications of this invention, the stationary servers will constitute the Internet, but partly or purely private network applications are also feasible.

VoWIFI may also be referred to as Wi-Fi calling, or GAN/UMA (Generic Access Network or Unlicensed Mobile Access). VoWIFI is in the present context to be understood as a solution whereby mobile service providers can deliver the same set of mobile voice and messaging services they currently offer over their macro cellular network, over any Wi-Fi network, globally. In short, it can be said that the cellular world has two separate core networks, called CS (circuit switched) that was used for voice and PS (packet switched) for data. As operators moved more and more voice communication over to the PS part two new terms evolved, Voice over HSPA/3G (VoHSPA) and Voice over LTE/4G (VoLTE), and subsequently it was realized that one can use WiFi to access the PS part of the network, hence, VoWIFI.

The VoWIFI is preferably used in accordance with the IEEE 802.11 standard, and may also be referred to as voice over WLAN (VoWLAN), but other wireless internet networks may also be used.

In more detail, VoWIFI enables the user to make standard phone calls over Wi-Fi. This is done by routing the call traffic through the Wi-Fi connection, instead of over the air to a cell tower. In VoWIFI the user dials the number, and places the call in a conventional way, just like in a circuit switched environment. However, the difference is that the call connects over Wi-Fi, and is transferred in data packets, and is subsequently injected back into the cellular network as if the call had been beamed over the air. Furthermore, an increasing number of smart phone providers are providing built-in support for Evolved Packet Core (EPC) integrated Wi-Fi calling support as part of their device fleet. This provides users with native Wi-Fi calling experience without any need to download a specific software application, but instead users can continue to use the built-in phone dialer and continue to be reached on their phone number. Unlike services like Skype, Viber, WhatsApp and other Over the Top (OTT) Voice over IP (VoIP) applications, which place calls using call forwarding or an internet-based interface, VoWIFI lets the user use the ordinary carrier phone number over the internet. VoWIFI is also distinct from VoIP technology in that VoIP transfers the voice over the internet to the switched telephone network, whereas VoWIFI connects the voice traffic to the mobile carrier's network using the internet instead of cell towers. A wireless communication system capable of transferring voice communication via VoWIFI between at least one mobile terminal and an exterior mobile network is disclosed in the pending and still unpublished Swedish patent application No. 1451302-2, by the present applicant, said document incorporated herein by reference in its entirety.

"Data streams" are traffic in need of routing. A stream is in the context of the present application to be seen as any and all communication with a specific combination of ultimate source and ultimate destination IP addresses and network ports, or whatever the equivalent of this would be in a networking scheme where these identifiers are not used or not sufficiently distinguishing. A stream is "created" when any entity on one side of the system seeks to communicate with any entity on the other side, using any specific combination of ports. In a phone call made over VoWIFI, the entire call may be considered to constitute a single data stream, or may alternatively be considered to be formed of several consecutive data streams.

The router and the remote server are preferably connected through a plurality of exterior mobile networks, which are simultaneously useable. Also, the router is preferably arranged to communicate with the communication server on at least two different data links (communication routes) having different characteristics, where the characteristics can be measured by the router. These characteristics may include packet loss (intermittent failure for packets of data to arrive), latency (round-trip response time, hence responsiveness), throughput (overall rate of data transmission, whether current or potential) and a variety of radiophysical metrics, such as signal strength. The data streams are then forwarded on one or several links to and from a dedicated external server, which may be referred to as an aggregation server or gateway. The different links thereby form a single virtual link between the router and the gateway.

The communication can be automatically optimized based on an evaluation based on the measured characteristics, and also optionally on other conditions, such as price. Thus, in addition to the evaluation, prioritizing and assignments may be made based on other static or dynamic parameters, such as signal strength and the like. Such further optimizations are per se known from EP 1 175 757 by the same applicant, said document hereby incorporated by reference. An automatic selection is then made among the available data links to use the most efficient combination. Hence, a seamless distribution of the data among the different data links is obtained.

The router may use any available data links, such as two or more of e.g. GSM, Satellite, DVB-T, HSPA, EDGE, 1xRTT, EVDO, LTE, Wi-Fi (802.11) and WiMAX; and combine them into one virtual network connection. In particular, it is preferred to use data links provided through wireless wide-area network (WWAN) communication technologies.

The selection of links is preferably made once for each data stream. However, re-selection for data streams that have failed may also be made. Further, data streams may also be split among two or more data links, e.g. by transferring a first part of a data stream on one data link to begin with, and then continue the transfer of the rest of the data stream on another data link, based on a re-assignment decision. Re-selection and/or re-assignment may also be made based on other criteria than complete failure of the presently used data link, such as when the evaluated quality of the link presently used is significantly deteriorated, falls below a certain threshold, or the like.

The present invention is based on the realization that if one is to provide a router onboard a vehicle, that is capable of recognizing a stream of data that corresponds to at least one of a VoIP stream and a VoWIFI stream (a call request or on-going call) and subsequently take action in accordance with the inventive method, one can drastically improve passenger satisfaction and the overall traveling experience.

By means of the present invention, many time-saving and possibly cost-saving functions are provided for the passengers of a public transport vehicle. As discussed earlier, VoWIFI and VoIP services are starting to replace the more conventional calls (via a CS network), which has introduced new problems and inconveniences for users when traveling. For example, generally the Wi-Fi network onboard a train will be "open" whereby many clients (e.g. smartphones, laptops, tablets, PDAs etc.) will directly establish a connection with the onboard wireless access point, provided that the client recognizes the network and has been connected to it before. Consequently the client will temporarily disable its data connection via the carrier network (e.g. 3G/4G connection) in favor for the Wi-Fi connection.

However, a vast majority of the onboard Wi-Fi access points or Wi-Fi hotspots include a captive portal to control the access to the external servers. Thus, many times a passenger will attempt to use a software application (which requires a working connection to the internet) which will exhibit a "no connection" error until the client has been authenticated. The authentication is normally performed by prompting the client to a special Web page accessed via a browser application on the client, where the passenger is required to provide authentication by logging in on a user-account, to pay a fee and/or to accept a use policy (Terms of Service). However, this requires that the passenger opens a browser application before he/she can use any other application which requires a working connection to the internet. This can be experienced as very tiresome and inconvenient by passengers, in particular when the passenger is in need of using a software application without delay, e.g. when attempting to make or expecting to receive a VoWIFI-call/VoIP-call, which wouldn't be possible since the device's internet access is restricted (the stream of wireless data packets is intercepted by the router). Therefore, by having the router recognize that a client is attempting to make a VoWIFI-call/VoIP-call, and forward this data stream automatically (i.e. allow the client internet access) without any authentication necessary, it will drastically improve the overall passenger experience. However, if it is determined in the router that the stream of wireless data packets does not correspond to at least one of a VoIP stream and a VoWIFI stream, the router will intercept (i.e. block) the stream unless the client is authenticated through the authentication process in the captive portal.

Moreover, the present invention allows for seamless handover for on-going VoLTE/VoHSPA/VoIP calls which are established and initiated through the carrier's cellular data network (e.g. 3G, 4G, etc.) and subsequently handed over to a Wi-Fi access point onboard the vehicle. Thus, the call may be continued via the Wi-Fi network on the public transport vehicle, instead of having the call disconnected when the device switches over to the Wi-Fi network onboard the vehicle due to the captive portal. As mentioned, the client (e.g. smartphone) will in many technologies automatically connect to a Wi-Fi access point onboard the vehicle during the ongoing call, which in conventional systems would disconnect the call. Therefore, the present invention further improves the passenger satisfaction since costs for the passenger are reduced and since the data connection provided through the Wi-Fi network is generally of superior quality as compared to the data connection provided through the carrier's cellular data network.

The determining of a possible match between a stream of wireless data packets and at least one of a VoIP stream and a VoWIFI stream is in one exemplary embodiment based on packet size and pattern of a packet stream, defined by the wireless data packets. Additionally, the match may depend on a source and/or a destination of the wireless data packets. It is for example known to be able to determine if a packet stream is related to web browsing, e-mailing, computer gaming, media-streaming, VoWIFI/VoIP, etc. based on the size and pattern of a packet stream. For example, a stream of small packets every 15-25 milliseconds in both directions can with high probability be recognized as VoWIFI/VoIP.

Therefore, in accordance with an exemplary embodiment of the present invention the step of determining, in the router, if a stream of wireless data packets from the at least one client on board the public transport vehicle corresponds to at least one of a VoIP stream and a VoWIFI stream comprises:

determining at least one of a source, a destination, a size and pattern of the stream of wireless data packets, and using this for identification if the stream of wireless data packets corresponds at least one of a VoIP stream and a VoWIFI stream. In addition to, or as an alternative, the step of determining if a stream of wireless data packets from the at least one client on board the public transport vehicle corresponds to at least one of a VoIP stream and a VoWIFI stream comprises identification of a data packet type or data stream type for the stream of wireless data packets based on deep packet inspection.

The concept of analyzing packet size and shape of various packet streams in order to identify and determine the data stream type, as such, is per se known, and often utilized in traffic shaping or packet shaping. Traffic shaping techniques can be found in e.g. US2005/0172008, EP1912385, US7061860, US2004/0111461, Adaptiband™ by XRoads Networks, Radware's Deep Flow Inspection™, and NAVL by Procera Networks, all of which are hereby incorporated by reference. However, as far as is presently known, this has never been used on public transport vehicles, and in particular not for the same purposes as in the present invention. It has now been realized by the present inventors that these various ways of determining a type of data stream can be used to improve the travelling experience and increase passenger satisfaction on public transport vehicles. Furthermore the present invention enables communication networks onboard public transport vehicles to be much more compatible with on-going technological trends such as VoLTE, VoWIFI, etc.

In accordance with another exemplary embodiment of the present invention the step of determining, in the router, if a stream of wireless data packets from the at least one client on board the public transport vehicle corresponds to at least one of a VoIP stream and a VoWIFI stream comprises:

comparing a destination address of the stream of wireless data packets to a whitelist comprising at least one predefined address. This is provides for an alternative or additional means for determining if a stream of wireless data packets corresponds to a at least one of a VoIP stream and a VoWIFI stream as compared to analyzing size and/or shape of the stream. A whitelist is in the present context to be interpreted as a defined list of IP-addresses and/or ports, where data streams associated with these IP-addresses are directly forwarded by the router and thus provided access to the internet via the router without any authentication requirement. Preferably the whitelist comprises at least one IP-address associated with VoWIFI and/or VoIP protocols, e.g. a destination address. The whitelist may also be dynamically and periodically updated.

In a similar way as discussed above, it is also possible to detect e.g. attempts to set-up Skype-calls and the like, e.g. over the cellular network (3G/4G), and to hand over the voice communication session to the router in order to handoff the voice communication session to a VoWIFI session. This further improves the overall travel experience for passengers by offering a seamless handover from the cellular network to a Wi-Fi network provided internally in the public transport vehicle. In addition to the oftentimes superior Quality of Service (QoS) provided by the Wi-Fi connection in comparison to the conventional cellular networks, the passengers may also save costs, in particular when traveling in foreign countries due to roaming charges. The determining step in the repeater unit may comprise determining if the wireless signal corresponds to at least one of a VoIP signal, a VoHSPA signal and a VoLTE signal. Thus, a passenger performing e.g. a Skype-call over the cellular network (3G/4G) can have the session handed over to the Wi-Fi network provided on board the vehicle.

According to another aspect of the present invention there is provided a wireless communication system for a public transport vehicle, such as a train, comprising:

at least one router in the public transport vehicle, the router being configured to receive and transmit wireless data packets to and from a stationary communication server outside the public transport vehicle through at least one exterior mobile network via at least one antenna, and to and from at least one client onboard the public transport vehicle, wherein the at least one router includes:

a captive portal in order to provide an authentication process for the at least one client; and
a control unit configured to:
determine if a stream of wireless data packets from the at least one client on board the public transport vehicle corresponds to at least one of a VoIP stream and a VoWIFI stream;
forward, if the stream of wireless data packets corresponds to at least one of a VoIP stream and a VoWIFI stream, the stream of wireless data packets, regardless of whether the at least one client associated with the stream of wireless data packets is authenticated by the authentication process or not.

With this aspect of the invention, similar advantages and preferred features are present as in the previously discussed first aspect of the invention.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION

Figure 1:
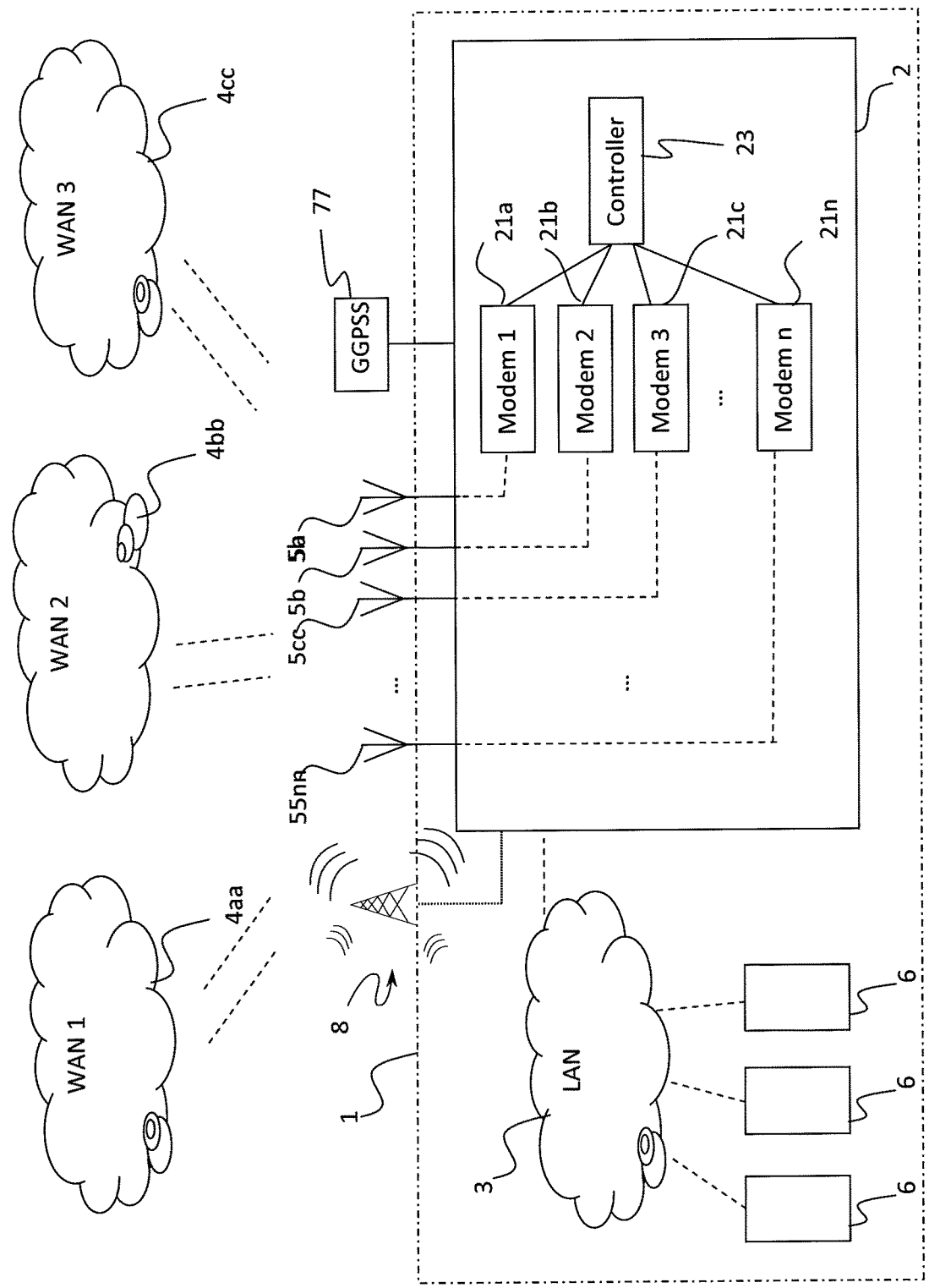
FIG. 1 is a schematic illustration of a train having a wireless communication system in accordance with an embodiment of the present invention.

In the following detailed description, some embodiments of the present invention will be described. However, it is to be understood that features of the different embodiments are exchangeable between the embodiments and may be combined in different ways, unless anything else is specifically indicated. It may also be noted that, for the sake of clarity, the dimensions of certain components illustrated in the drawings may differ from the corresponding dimensions in real-life implementations of the invention. Even though in the following description, numerous specific details are set forth to provide a more thorough understanding of e present invention, it will be apparent to one skilled in the art that the present invention may be practiced without these specific details. In other instances, well known constructions or functions are not described in detail, so as not to obscure the present invention.

In FIG. 1 a schematic illustration of a vehicle 1, such as a train, having a communication system, is provided. The communication system comprises a data communication router 2 for receiving and transmitting data between an internal local area network (LAN) 3, and one or several external wide area networks (WANs) 4a, 4b, 4c. Specifically, the router 2 preferably includes a captive portal (sometimes referred to as a captive portal policy) which allows an administrator to block internet access for users until they complete an authentication process. Conventionally captive portals are known to be utilized e.g. by public WiFi-hotspots. Communication to and from the WANs is provided through two or more antennas 5 a-n on the vehicle roof. Two or more data links are preferably available, either between the train and one of the WANs, and/or by using several WANs simultaneously.

The LAN is preferably a wireless network, using one or several internal antennas to communicate with clients 6 within the vehicle 1. The LAN may be set-up as wireless access point(s). The client(s) 6 may be computing devices such as laptops, mobiles telephones, PDAs and so on.

The data communication router comprises a plurality of modems 21 a-n. Assignment of data streams to different WANs and/or to different data links on one WAN is controlled by a control unit 23 (also known as a controller 23). The control unit 23 is preferably realized as a software controlled processor. However, the controller 23 may alternatively be realized wholly or partly in hardware.

The control unit 23 is furthermore preferably arranged or configured to determine if wireless data packets match or correspond to at least one of a VoIP stream and a VoWIFI stream. Moreover, the control unit 23 is preferably configured to forward the stream of wireless data packets if it is determined that the stream corresponds to at least one of a VoIP stream and a VoWIFI stream, regardless of whether the client associated with that particular stream of wireless data packets is authenticated by the authentication process (provided by the captive portal) or not. This allows the router to effectively by-pass the captive portal when detecting a VoIP call or a VoWIFI call, for the convenience of the passengers.

The system may also comprise a GNSS (Global Navigation Satellite System) receiver, such as a global positioning system (GPS) receiver 7, for receiving GNSS/GPS signals indicative of the current position of the vehicle, and wherein the controller may be arranged to use this data e.g. to comply with national regulations etc.

Furthermore, the system may also comprise a repeater unit 8 for receiving a wireless signal and re-transmitting an amplified wireless signal between onboard clients 6 and an exterior mobile network 4. The repeater unit is preferably configured to determine if a wireless signal corresponds to a voice communication session, such as a Skype-call, and subsequently hand over this voice communication session to the router 2 in order to handoff the voice communication session to a VoWIFI session. The repeater unit may additionally or alternatively be configured to specifically detect if the wireless signal corresponds to a VoIP signal, a VoHSPA signal or a VoLTE signal.

The data communication router may also be denominated MAR (Mobile Access Router) or MAAR (Mobile Access and Applications Router).

The determining and the associated analysis (packet sniffing) of the received data packets may be realized in various ways. For example, it may involve comparing a destination address of a stream of data packets to a whitelist comprising at least one defined address. The whitelist is configurable by a user or administrator of the network, and a plurality of carriers use the same destination address(es) for their VoIP/VoWIFI services, thus they can be anticipated and accordingly entered into the whitelist.

The data communication router is preferably arranged to communicate on at least two different communication routes having different characteristics. Hereby, the communication can be automatically optimized based on specific conditions, such as price, speed, etc. Such data communication routers are known from EP 1 175 757 by the same applicant, said document hereby incorporated by reference. Such routers are also commercially available from the applicant, Icomera AB. Hereby, the router may use all available data channels, such as two or more of e.g. Satellite, HSPA, EDGE, EVDO, LTE, LTE-A, WiFi (802.11) and WiMAX; and combine them into one virtual network connection. An automatic selection is then made among the available channels to use the most cost efficient combination that fulfils the users' availability, bandwidth and reliability requirements. Hence, a seamless distribution of the data among said different channels is obtained.

The transferring of data streams through different data links may additionally or alternatively comprises the two main steps: evaluation and assignment. Each of these permits some variability. Numerous types of tests, generating a predictable response, such as an echo, could be performed to evaluate link quality, and such tests can be combined in any order, serially or in parallel. The following are only examples.

Any of a variety of common Internet functions can be taken to indicate the usefulness of a link. For example, a WWAN Internet service provider (ISP) will normally offer the addresses of one or more domain name system (DNS) servers, an essential service. DNS queries can be bound to each link, to attempt to resolve a largely arbitrary domain name using one of the ISP's provided servers, or any other. Failure to respond within a given time frame is taken to mean either a general problem transferring the small amount of data, or a more specific problem with the queried DNS server.

If the queried DNS server belongs to the ISP, the latter will often indicate a severe problem at the ISP for that specific link. Because a DNS request typically consists of a single UDP or TCP packet going each way, this type of test is very light. The infrastructure typically prioritize DNS queries and DNS responses highly in traffic control algorithms, which is another reason why this type of test can be expected to complete very quickly, if at all. The timeout on it can therefore be set very low, producing high responsiveness. The lightness of a DNS test is both an advantage and, to some extent, a drawback. It detects qualitative problems, and is very quick. It also results in a low transfer of data, and does not strain the link, which in turn means that the tests can be repeated very frequently. However, because it does not strain the link, it is a poor indicator of quantitative performance.

Another example of an embodiment therefore uses the ICMP protocol. In this protocol, an ECHO_REQUEST datagram is used to elicit an ECHO_RESPONSE from an arbitrary remote host, preferably a very stable one.

In normal use, ICMP testing is light in the same way as DNS testing. In addition, it is easier for ISPs to prioritize ICMP in unknown ways, because it is a special protocol and does not represent an essential service. Unpadded ICMP requests are likely to receive a very high priority, because ICMP is a standard test of network latency. When highly prioritized, it gives the illusion of good overall responsiveness, while payload data in other types of containers gets a lower priority and relatively poor performance in case of congestion.

As part of the protocol, ICMP packets can be padded with extra bytes of data. This provides a simple, universally recognized method of loading down a link with a very precise burst of traffic, and timing the response. The fact that one and the same packet constitutes the load and is timed is the greatest virtue of this test, because it measures how heavy traffic on a link will actually be treated. In practice, there is often a substantial difference in how a stream of ICMP packets is treated, depending on their size. When padded packets fail to arrive under a given timeout, this is an indicator of performance problems.

The ICMP request may be sent to any type of stationary communication server accessible through the exterior network, such as a DNS server, a gateway through which the communication from the moving vehicle is transferred, a content provider server, or the like.

These embodiments for evaluation mentioned thus far can be generalized as one: any active sending of a request or other provocation across a network, through a specific link, with the expectation of receiving a response under a timeout or corresponding safeguard. Variations on this theme include factors such as protocol, target host location, the amount of traffic sent and solicited, and the precise limit set by the timeout function. Obviously, factors external to the individual test, such as the interval between repetitions of the same type of test, is also a potential subject of fine tuning.

Figure 2:
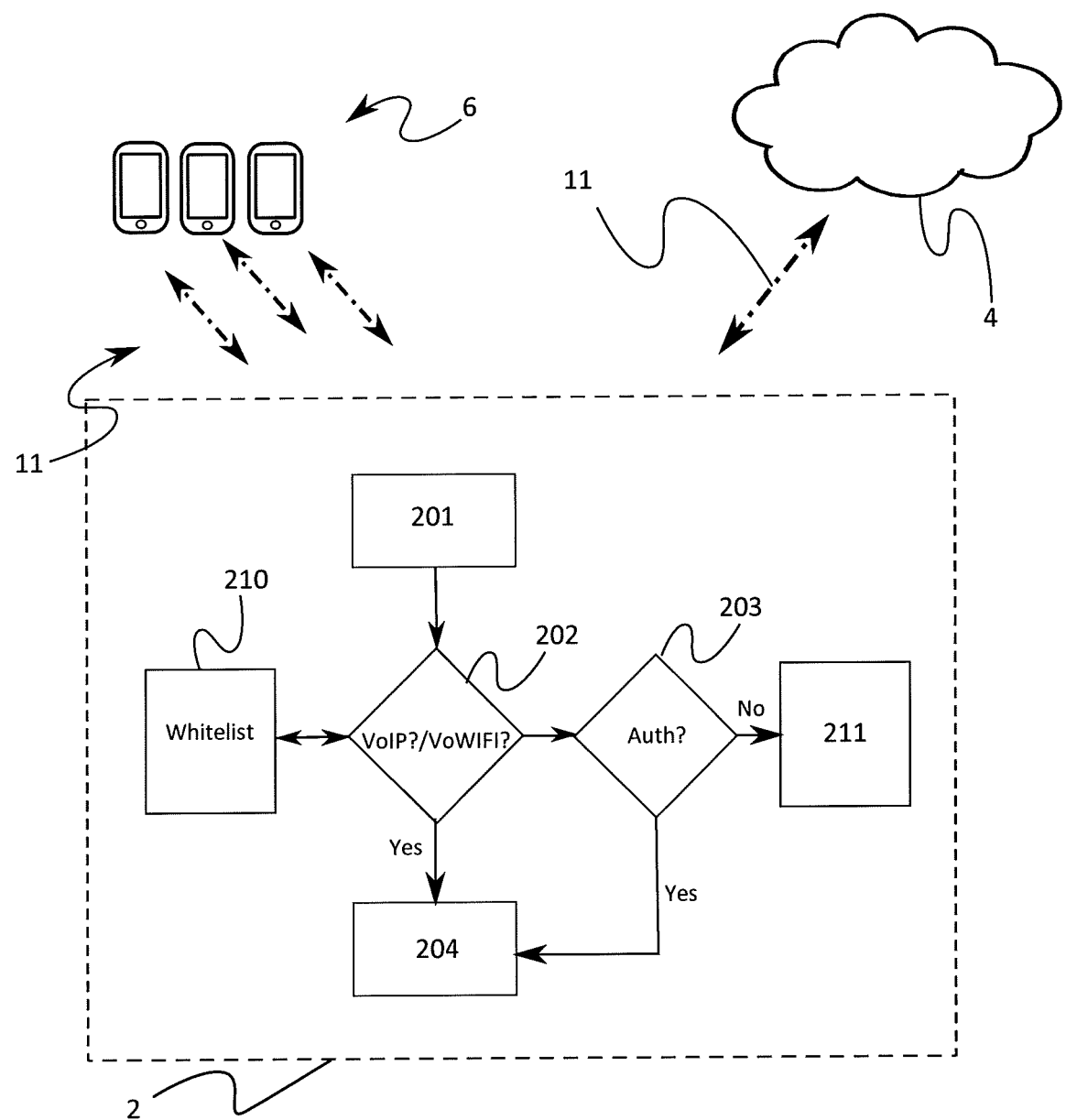
FIG. 2 is a schematic flow chart illustrating a traffic forwarding sequence in accordance with an embodiment of the present invention.

In FIG. 2 a schematic flow chart of a method for wireless communication between a public transport vehicle and a remote server through at least one external mobile network 4, according to an embodiment of the invention, is illustrated. The figure shows the traffic forwarding sequence in a schematically represented router 2. Data packets are sent and received, as indicated by the arrows 11, between a set of clients 6, here illustrated as smart phones, and an external mobile network 4, via the router 2. The data packets are received 201 by the router 2, or any other suitable network edge device. In a subsequent process step 202, the type of data packets are determined. The determining step 202 starts with an analysis of the data packets, where it is to be determined if the stream of data packets correspond to a stream of VoIP data packets or a stream of VoWIFI data packets. The analysis can be done by checking the size and pattern of the data packet stream as defined by the received packets. The analysis can also be performed by additionally or separately checking source and destination of the packets. For example, the determining step 202 may include a comparing step, where a destination address of the stream of data packets is compared to a whitelist 210 comprising at least one predefined address. However, the analysis of the data packets may be performed in various ways, as earlier stated, according to specific requirements or needs.

If it is determined that the stream of data packets corresponds to a stream of VoIP data packets or a stream of VoWIFI data packets, then the stream is forwarded in a subsequent step 204. However, if it would be determined that the stream of data packets does not correspond to VoIP or VoWIFI, an authentication check 203 can be performed in a subsequent process step. This is in order to check if the client 6, that is associated with the stream of data packets (that has been determined to not correspond to a VoIP stream or VoWIFI stream), has already been authenticated via the captive portal of the router. If this is true then the stream of data packets is forwarded 204 accordingly, otherwise the stream of packets is intercepted 211 in a subsequent step.

The present invention has here mainly been disclosed in relation to trains, where it is considered to be particularly advantageous. However, it may also be implemented and used on other public transport vehicles, and in particular vehicles intended for passenger traffic, such as buses, ferries, airplanes, etc.

The invention claimed is:

1. A method for wireless communication between a public transport vehicle and a remote server through at least one external mobile network, comprising:
   providing at least one router in the public transport vehicle for receiving and transmitting wireless data to and from a stationary communication server outside said public transport vehicle through said at least one external mobile network via at least one antenna and to and from at least one client onboard the public transport vehicle, wherein said at least one router includes a captive portal in order to provide an authentication process for said at least one client;
   determining in said router, if a stream of wireless data packets received by said router corresponds to at least one of a VoIP stream and a VoWIFI stream; and
   forwarding in said router, if it has been determined that said stream of wireless data packets corresponds to at least one of a VoIP stream and a VoWIFI stream, said stream of wireless data packets regardless of whether said at least one client associated with said stream of wireless data packets is authenticated by said authentication process or not; and
   intercepting, in said router, if said stream of wireless data packets does not correspond to at least one of a VoIP stream and a VoWIFI stream, said stream of wireless data packets unless said at least one client associated with said stream of wireless data packets on board the public transport vehicle is authenticated through the authentication process in said captive portal.

2. The method according to claim 1, wherein the determining, in said router, if a stream of wireless data packets received by said router corresponds to at least one of a VoIP stream and a VoWIFI stream comprises:
   determining at least one of a source, a destination, a size and pattern of the stream of wireless data packets, and using this for identification if said stream of wireless data packets corresponds to at least one of a VoIP stream and a VoWIFI stream.

3. The method according to claim 1, wherein the determining, in said router if a stream of wireless data packets received by said router corresponds to at least one of a VoIP stream and a VoWIFI stream comprises:
   identification of a data packet type or data stream type for said stream of wireless data packets based on deep packet inspection.

4. The method according to claim 1, wherein the determining, in said router, if a stream of wireless data packets received by said router corresponds to at least one of a VoIP stream and a VoWIFI stream comprises:
   comparing a destination address of said stream of wireless data packets to a whitelist comprising at least one predefined address.

5. The method according to claim 1, wherein the determining, in said router, if a stream of wireless data packets received by said router corresponds to at least one of a VoIP stream and a VoWIFI stream comprises:
   comparing an output port of said stream of wireless data packets to a whitelist comprising at least one predefined output port.

6. The method of claim 1, wherein the determining, in said router, if a stream of wireless data packets from said at least one client on board the public transport vehicle corresponds to at least one of a VoIP stream and a VoWIFI stream comprises:
   determining a size and pattern of the stream of wireless data packets, and using this for identification if said stream of wireless data packets corresponds to at least one of a VoIP stream and a VoWIFI stream.

7. A wireless communication system for a public transport vehicle, comprising:
   at least one router in the public transport vehicle, said router being configured to receive and transmit wireless data packets to and from a stationary communication server outside said public transport vehicle through at least one exterior mobile network via at least one antenna, and to and from at least one client onboard the public transport vehicle, wherein said at least one router includes:
   a captive portal in order to provide an authentication process for said at least one client; and
   a control unit configured to:
      determine if a stream of wireless data packets from said at least one client on board the public transport vehicle corresponds to at least one of a VoIP stream and a VoWIFI stream;
      forward, if said stream of wireless data packets corresponds to at least one of a VoIP stream and a VoWIFI stream, said stream of wireless data packets, regardless of whether said at least one client associated with said stream of wireless data packets is authenticated by said authentication process or not; and intercept, if said stream of wireless data packets does not correspond to a at least one of a VoIP stream and a VoWIFI stream, said stream of wireless data packets until said at least one client on board is authenticated.

8. The method of claim 1, wherein the router is configured to seamlessly handover calls which have been initiated through a cellular data network to VoIP or VoWIFI streams.

9. The wireless communication system of claim 7, wherein the router is configured to seamlessly handover calls which have been initiated through a cellular data network to VoIP or VoWIFI streams.

10. The wireless communication system of claim 7, wherein determining, by said control unit, if a stream of wireless data packets from said at least one client on board the public transport vehicle corresponds to at least one of a VoIP stream and a VoWIFI stream comprises:
   determining a size and pattern of the stream of wireless data packets, and using this for identification if said stream of wireless data packets corresponds to at least one of a VoIP stream and a VoWIFI stream.

\* \* \* \* \*